(12) United States Patent
Borgerson

(10) Patent No.: US 8,029,404 B2
(45) Date of Patent: Oct. 4, 2011

(54) HYBRID TRANSMISSION

(75) Inventor: James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 12/370,114

(22) Filed: Feb. 12, 2009

(65) Prior Publication Data

US 2010/0204002 A1    Aug. 12, 2010

(51) Int. Cl.
 *F16H 3/44*    (2006.01)
(52) U.S. Cl. ...................................... 475/280
(58) Field of Classification Search ............... 180/65.21, 180/65.22; 475/5, 280, 283, 285; 903/903, 903/904, 907, 911, 902; 477/3
See application file for complete search history.

(56) References Cited

U.S. PATENT DOCUMENTS

| | | | |
|---|---|---|---|
| 6,208,036 B1 | 3/2001 | Evans et al. | |
| 6,537,170 B2 * | 3/2003 | Murasugi et al. | 475/128 |
| 7,762,365 B2 * | 7/2010 | Iwanaka et al. | 180/65.22 |
| 2008/0207375 A1 * | 8/2008 | Shimizu et al. | 475/127 |
| 2009/0098970 A1 * | 4/2009 | Kimes | 475/5 |
| 2010/0087290 A1 * | 4/2010 | Schoenek et al. | 477/5 |

* cited by examiner

*Primary Examiner* — David D Le
*Assistant Examiner* — David J Hlavka
(74) *Attorney, Agent, or Firm* — Quinn Law Group, PLLC

(57) ABSTRACT

A hybrid transmission includes an input member, an output member, a stationary member, and first and second planetary gearsets having a plurality of planetary gearset members. A first one-way clutch is operatively connected to the input member and at least one of the planetary gearset members. A second one-way clutch is operatively connected to at least one of the planetary gearset members and the stationary member. A first torque transmitting mechanism is selectively engageable to couple at least one of the planetary gearset members to the stationary member. A second torque transmitting mechanism being selectively engageable to operatively connect the input member to at least one of the planetary gearset members for unitary rotation.

11 Claims, 1 Drawing Sheet

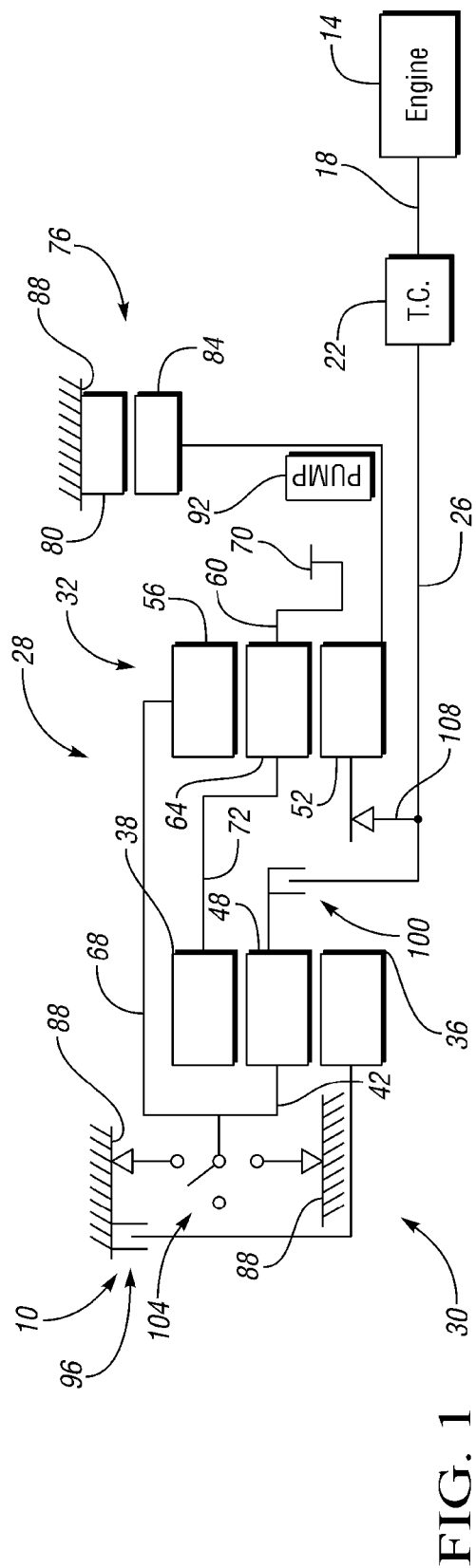
FIG. 1
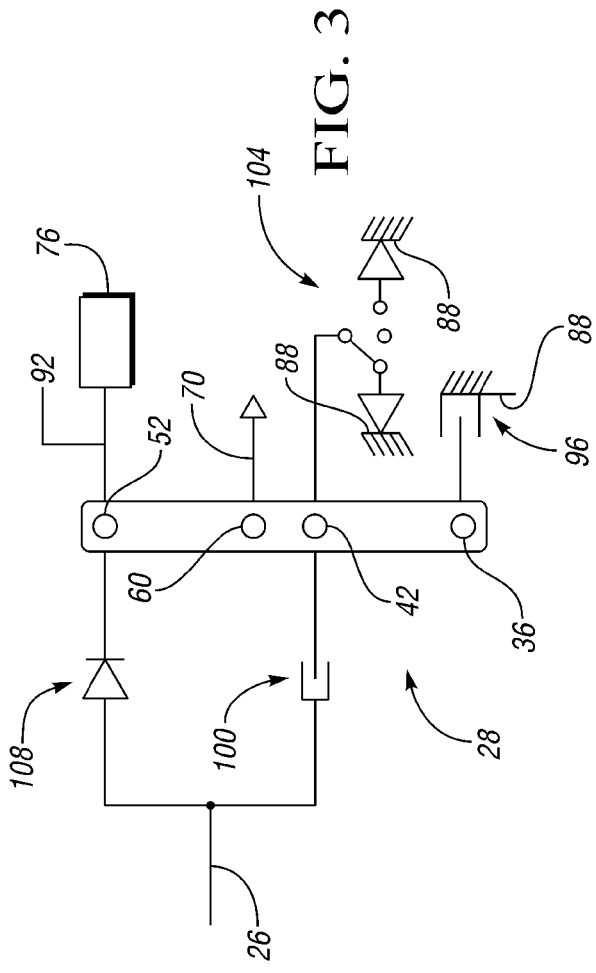
FIG. 2
FIG. 3

HYBRID TRANSMISSION

TECHNICAL FIELD

This invention relates to hybrid powertrains.

BACKGROUND OF THE INVENTION

A motor vehicle transmission typically includes an input member and an output member. The input member is typically coupled to the vehicle engine through a fluid coupling such as a torque converter, and the output member is operatively coupled to the vehicle drive wheels through a differential gear set. The transmission employs a number of gear elements and selectively engageable friction elements (referred to herein as clutches) that are controllable to vary the speed ratio between the input and output members.

SUMMARY OF THE INVENTION

According to a first aspect of the disclosure, a hybrid transmission includes an input member, an output member, a stationary member, and first and second planetary gearsets having a plurality of planetary gearset members. A first one-way clutch is operatively connected to the input member and at least one of the planetary gearset members. A second one-way clutch is operatively connected to at least one of the planetary gearset members and the stationary member. A first torque transmitting mechanism is selectively engageable to couple at least one of the planetary gearset members to the stationary member. A second torque transmitting mechanism being selectively engageable to operatively connect the input member to at least one of the planetary gearset members for unitary rotation.

A motor/generator has a rotor that is operatively connected to at least one of the planetary gearset members for unitary rotation. The second one-way clutch and the first and second torque transmitting mechanisms are operative in various combinations to provide four forward speed ratios between the input member and the output member.

According to a second aspect of the disclosure, a hybrid transmission includes an input member, an output member, a stationary member, and first and second planetary gearsets having respective first, second, and third members. A motor/generator has a rotor that is operatively connected to the first member of the first planetary gearset for unitary rotation therewith. The output member, the second member of the first planetary gearset, and the first member of the second planetary gearset are operatively interconnected for unitary rotation. The third member of the first planetary gearset and the second member of the second planetary gearset are operatively interconnected for unitary rotation.

A first one-way clutch is operatively connected to the input member and the first member of the first planetary gearset. A second one-way clutch is operatively connected to the stationary member and the second member of the second planetary gearset. The second one-way clutch is characterized by a selectable first state in which the second one-way clutch prevents rotation of the second member of the second planetary gearset in a first direction, and a selectable second state in which the second one-way clutch prevents rotation of the second member of the second planetary gearset in a second direction.

A first selectively engageable torque transmitting device is configured to selectively couple the input member and the second member of the second planetary gearset for unitary rotation. A second selectively engageable torque transmitting device is configured to selectively couple the third member of the second planetary gearset to the stationary member.

According to a third aspect of the disclosure, a hybrid transmission includes an input member, an output member, a stationary member, and first and second planetary gearsets. The first planetary gearset has a first sun gear member, a first ring gear member, and a first planet carrier member. The second planetary gearset has a second sun gear member, a second ring gear member, and a second planet carrier member. A motor/generator has a rotor that is operatively connected to the first sun gear member for unitary rotation therewith. The output member, the first planet carrier member, and the second ring gear member are operatively interconnected for unitary rotation. The first ring gear member and the second planet carrier member are operatively interconnected for unitary rotation.

A first one-way clutch is operatively connected to the input member and the first sun gear member. A second one-way clutch is operatively connected to the stationary member and the second planet carrier member, and is characterized by first and second selectable states. In the first state, the second one-way clutch prevents rotation of the second planet carrier member in a first direction. In the second state, the second one-way clutch prevents rotation of the second planet carrier member in a second direction.

A first selectively engageable torque transmitting device is configured to selectively couple the input member and the second planet carrier member for unitary rotation. A second selectively engageable torque transmitting device is configured to selectively couple the second sun gear member to the stationary member.

The hybrid transmission provided herein provides similar functionality with reduced parts content compared to prior art hybrid transmissions.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic depiction of a powertrain including an engine, a motor/generator, and a transmission;

FIG. 2 is a truth table depicting a shift logic for the transmission of FIG. 1; and FIG. 3 shows a lever diagram of the transmission of FIG. 1.

DESCRIPTION OF THE PREFERRED EMBODIMENTS

Referring to FIG. 1, a powertrain 10 includes an engine 14. Those skilled in the art will recognize a variety of engine configurations that may be employed within the scope of the claimed invention. For example, engine 14 may be a spark ignition or compression ignition reciprocating engine, a gas turbine, etc., within the scope of the claimed invention. The engine 14 is characterized by an output member such as a crankshaft 18. A fluid coupling, such as torque convertor 22, operatively connects the crankshaft 18 to the input member 26 of a transmission 28.

The transmission 28 includes two planetary gearsets 30, 32. Planetary gearset 30 includes a sun gear member 36, a ring gear member 38, and a planet carrier member 42. A plurality of planet gear members 48 are rotatably mounted with respect to the planet carrier member 42. Each of the planet gear members 48 is meshingly engaged with the sun gear member 36 and the ring gear member 38.

Planetary gearset 32 includes a sun gear member 52, a ring gear member 56, and a planet carrier member 60. A plurality of planet gear members 64 are rotatably mounted with respect to the planet carrier member 60. Each of the planet gear members 64 is meshingly engaged with the sun gear member 52 and the ring gear member 56.

Planet carrier member 42 is continuously operatively connected to ring gear member 56 for rotation therewith by an interconnecting member 68. The output member 70 of the transmission 28 is continuously operatively connected to the planet carrier member 60 for rotation therewith. Ring gear member 38 is continuously operatively connected to planet carrier member 60 for rotation therewith by an interconnecting member 72.

The transmission 28 includes an electric motor/generator 76. The motor/generator 76 includes a stator 80 and a rotor 84. The stator 80 is mounted with respect to a stationary member such as the housing 88 of the transmission 28. The rotor 84 is continuously operatively connected to the sun gear member 52 for rotation therewith. A hydraulic pump 92 is operative connected to the rotor 84 and the sun gear member 52 to be driven thereby.

The transmission 28 includes a plurality of torque transmitting mechanisms. More specifically, brake 96 is a torque transmitting mechanism that is operative to selectively ground sun gear member 36. That is, brake 96 is selectively engageable to couple the sun gear member 36 to a stationary member, such as the transmission housing 88, to prevent rotation of the sun gear member 36 relative to the housing 88. Clutch 100 is a torque transmitting mechanism that is selectively engageable to couple the planet carrier member 42 to the input member 26 for rotation therewith.

Selectable one-way clutch 104 is a torque transmitting mechanism that is characterized by three selectable states, and is operatively connected to the housing 88 and the planet carrier member 42. More specifically, in a first state, one-way clutch 104 prevents rotation of the planet carrier member 42 in a first direction while permitting rotation of the planet carrier member 42 in a second direction. In a second state, the one-way clutch 104 prevents rotation of the planet carrier member 42 in the second direction while permitting rotation of the planet carrier member 42 in the first direction. In a third, neutral state, the one-way clutch 104 permits rotation of the planet carrier member 42 in both the first and second directions. One-way clutch 104 may, for example, be mechanically or electro-mechanically controlled. One-way clutch 108 is a torque transmitting mechanism that operatively connects the input member 26 to the sun gear member 52.

The torque transmitting mechanisms 96, 100, 104 are engageable or manipulable in various combinations to achieve four forward speed ratios and a reverse ratio between the input member 26 and the output member 70. FIG. 2 is a truth table depicting the various combinations of torque transmitting mechanisms 96, 100, 104 that achieve the four forward speed ratios, the reverse speed ratio, and a neutral condition. It should be noted that, in the embodiment depicted, one-way clutch 108 is passive; an "X" in the column for one-way clutch 108 does not indicate active engagement of one-way clutch 108, but rather indicates that the one-way clutch 108 transfers torque from the input member 26 to the sun gear member 52.

Referring to FIGS. 1 and 2, in the reverse ratio, one-way clutch 104 is in its first state, and clutches 96 and 100 are not engaged. In an alternative reverse ratio mode (not shown in FIG. 2), one-way clutch 104 is in its neutral state, clutch 96 is engaged, and clutch 100 is not engaged. In the neutral condition for the transmission 28, one-way clutch 104 is in its neutral state and clutches 96, 100 are not engaged. In the first forward speed ratio, one-way clutch 104 is in its second state, and clutches 96, 100 are disengaged. In the second forward speed ratio, clutch 96 is engaged and clutch 100 is not engaged. In the third forward speed ratio, clutch 100 is engaged and clutch 96 is disengaged. In the fourth forward speed ratio, clutches 96 and 100 are both engaged.

The transmission 28 is selectively operable in an "engine only" mode, an "electric only" mode, a parallel hybrid mode, and a regenerative braking mode. In the "engine only" mode, the engine 14 actively supplies torque to the transmission 28 and the motor/generator 76 does not actively supply torque to the transmission 28. In the "electric only" mode, the electric motor/generator 76 actively supplies torque to the transmission 28 and the engine 14 does not actively supply torque to the transmission. In the parallel hybrid mode, both the engine 14 and the motor/generator 76 supply torque to the transmission concurrently. In the regenerative braking mode, the motor/generator 76 does not actively supply torque to the transmission, but does act as a generator to passively supply torque to the drive wheels (not shown) of the vehicle via the output member 70 to reduce the speed of the vehicle and to transform the kinetic energy of the vehicle to electrical energy.

The transmission 28 is characterized by electric only operation in the reverse speed ratio. It should be noted that the rotor 84 rotates in one direction when the motor/generator 76 actively applies torque in the reverse speed ratio, and rotates in the opposite direction when the motor/generator 76 actively applies torque in the forward speed ratios. Accordingly, it may be desirable for one-way clutch 108 to be a selectable two-state one-way clutch to disconnect the torque converter 22 during operation in the reverse speed ratio.

In the second, third, and fourth forward speed ratios, one-way clutch 104 may be in its neutral state or in its second state. It may be desirable to retain the one-way clutch 104 in its second state in the second, third, and fourth forward speed ratios so that, if a downshift to the first speed ratio is desired, the status of the one-way clutch 104 does not need to be changed.

In the fourth speed ratio, both plate clutches 96, 100 are engaged, so the transmission 28 has only two one-way clutches, i.e., clutches 104, 108, slipping in the fourth speed ratio. The transmission provides freewheeling shifts from the first speed ratio to the second speed ratio, and from the third speed ratio to the fourth speed ratio.

It should be noted that the transmission 28 is capable of default operation in the first speed ratio for engine start/stop without auxiliary pump operation. More specifically, power-flow can be arranged so that there is a default to the first speed ratio with selectable one-way clutch 104 being electro-mechanically controlled. An electric starter (not shown) may be required for engine start/stop operation.

Pump 92 is operatively connected to the rotor 84 so that the pump 92 is drivable by the motor/generator 76; accordingly, the pump 92 is driven during electric only operation in the second speed ratio. It may be desirable for the pump 92 to be capable of reverse rotation, or to have a small one-way clutch operatively interconnecting the pump 92 to the rotor 84, because, in the reverse ratio, the rotor 84 rotates in a different direction than in the forward speed ratios.

The regenerative braking mode is available in all four forward speed ratios, although clutch 104 may need to be electro-mechanically controlled for regenerative braking in the first speed ratio.

Referring to FIG. 3, wherein like reference numbers refer to like components from FIGS. 1 and 2, the transmission 28 is depicted in lever diagram form. As seen in FIG. 3, the transmission 28 is characterized by four nodes (i.e., gear members 36, 42, 60, and 52).

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; a stationary member;
first and second planetary gearsets having a plurality of planetary gearset members;
a first one-way clutch operatively connected to the input member and at least one of the planetary gearset members;
a second one-way clutch operatively connected to at least one of the planetary gearset members and the stationary member;
a first torque transmitting mechanism being selectively engageable to couple at least one of the planetary gearset members to the stationary member; and
a second torque transmitting mechanism being selectively engageable to operatively connect the input member to at least one of the planetary gearset members for unitary rotation;
a motor/generator having a rotor that is operatively connected to at least one of the planetary gearset members for unitary rotation;
wherein the second one-way clutch and the first and second torque transmitting mechanisms are operative in various combinations to provide four forward speed ratios between the input member and the output member.

2. The transmission of claim 1, further comprising a pump operatively connected to the rotor to be driven thereby.

3. The transmission of claim 1, further comprising a fluid coupling operatively connected to the input member and connectable to an engine crankshaft.

4. A transmission comprising:
an input member; an output member; a stationary member;
first and second planetary gearsets having respective first, second, and third members;
a motor/generator having a rotor;
said rotor and said first member of the first planetary gearset being operatively interconnected for unitary rotation;
said output member, said second member of the first planetary gearset, and said first member of the second planetary gearset being operatively interconnected for unitary rotation;
said third member of the first planetary gearset and said second member of the second planetary gearset being operatively interconnected for unitary rotation;
a first one-way clutch operatively connected to the input member and the first member of the first planetary gearset;
a second one-way clutch operatively connected to the stationary member and the second member of the second planetary gearset, and being characterized by a selectable first state in which the second one-way clutch prevents rotation of the second member of the second planetary gearset in a first direction, and a selectable second state in which the second one-way clutch prevents rotation of the second member of the second planetary gearset in a second direction;
a first selectively engageable torque transmitting device being configured to selectively couple the input member and the second member of the second planetary gearset for unitary rotation; and
a second selectively engageable torque transmitting device being configured to selectively couple the third member of the second planetary gearset to the stationary member.

5. The transmission of claim 4, further comprising a pump operatively connected to the rotor to be driven thereby.

6. The transmission of claim 4, further comprising a fluid coupling operatively connected to the input member.

7. The transmission of claim 4, wherein the second one-way clutch is characterized by a third state in which the second one-way clutch does not prevent rotation of the second member of the second planetary gearset in either of the first and second directions.

8. A transmission comprising:
an input member; an output member; a stationary member;
a first planetary gearset having a first sun gear member, a first ring gear member, and a first planet carrier member;
a second planetary gearset having a second sun gear member, a second ring gear member, and a second planet carrier member;
a motor/generator having a rotor;
said rotor and said first sun gear member being operatively interconnected for unitary rotation;
said output member, said first planet carrier member, and said second ring gear member being operatively interconnected for unitary rotation;
said first ring gear member and said second planet carrier member being operatively interconnected for unitary rotation;
a first one-way clutch operatively connected to the input member and the first sun gear member;
a second one-way clutch operatively connected to the stationary member and the second planet carrier member, and being characterized by a selectable first state in which the second one-way clutch prevents rotation of the second planet carrier member in a first direction, and a selectable second state in which the second one-way clutch prevents rotation of the second planet carrier member in a second direction;
a first selectively engageable torque transmitting device being configured to selectively couple the input member and the second planet carrier member for unitary rotation; and
a second selectively engageable torque transmitting device being configured to selectively couple the second sun gear member to the stationary member.

9. The transmission of claim 8, further comprising a pump operatively connected to the rotor to be driven thereby.

10. The transmission of claim 8, further comprising a fluid coupling operatively connected to the input member.

11. The transmission of claim 8, wherein the second one-way clutch is characterized by a third state in which the second one-way clutch does not prevent rotation of the second planet carrier member in either of the first and second directions.

* * * * *